Dec. 16, 1969   L. FRICKER   3,483,853
INTERNAL COMBUSTION ENGINE FOR DRIVING VEHICLES
Filed Oct. 20, 1967   2 Sheets-Sheet 1

INVENTOR
LUDWIG FRICKER

BY *Craig & Antonelli*

ATTORNEYS

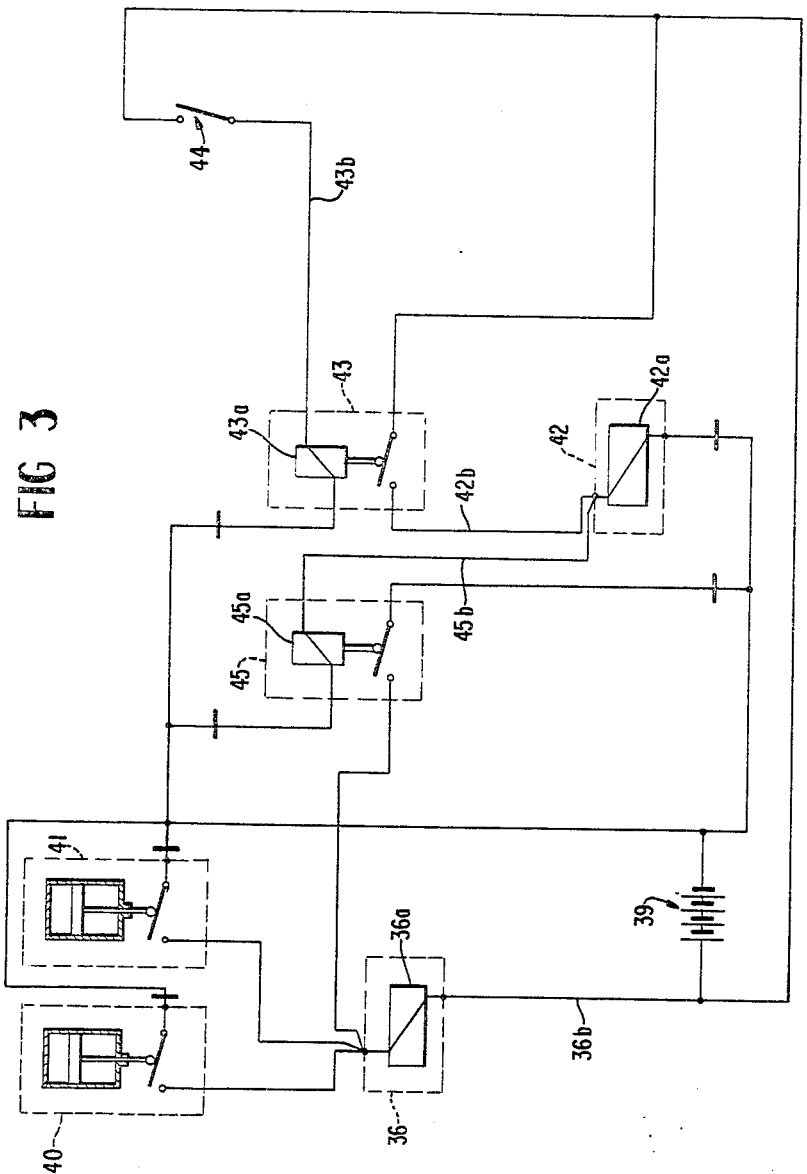

3,483,853
INTERNAL COMBUSTION ENGINE FOR DRIVING VEHICLES

Ludwig Fricker, Stuttgart-Feuerbach, Germany, assignor to Daimler-Benz Aktiengesellschaft, Stuttgart-Unterturkheim, Germany
Filed Oct. 20, 1967, Ser. No. 676,833
Claims priority, application Germany, Oct. 21, 1966,
D 51,379
Int. Cl. F02d 9/00; F02b 77/00; B60k 25/00
U.S. Cl. 123—102
12 Claims

ABSTRACT OF THE DISCLOSURE

An internal combustion engine for driving a vehicle, in particular an injection-type engine which also has a selectively engageable auxiliary drive for various vehicle accessories, for example, the compressor of an air-conditioning installation, in which a switch selectively turns on and off the auxiliary drive of such accessory which switch, in turn, is connected with an installation that effects an increase in the filling of the working cylinders by interaction with the control member controlling the supply of fuel and air in such a manner that in the position of the switch in which the auxiliary drive is connected to the engine, an increase in the filling corresponding to the desired increase in the idling speed torque is necessarily realized during the idling speed operation of the internal combustion engine.

BACKGROUND OF THE INVENTION

Figure 1:
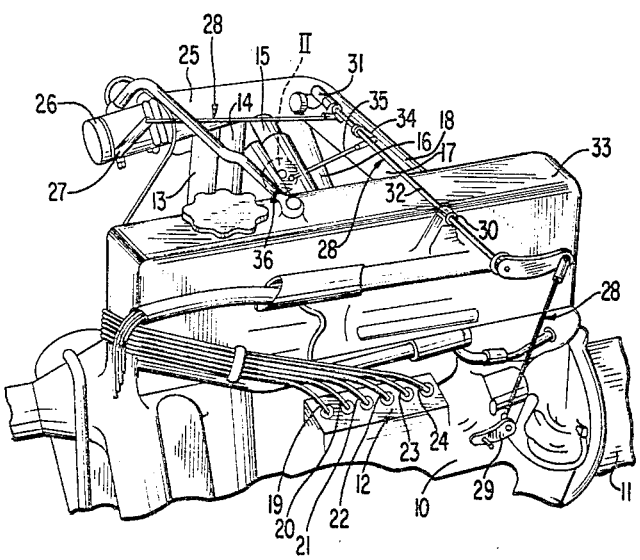

The present invention relates to an internal combustion engine for driving vehicles, especially to an injection-type piston internal combustion engine from which is derived or taken off at least one auxiliary drive, adapted to be turned on and off, for accessories of the vehicle equipment—for example, for the compressor of an air-conditioning installation.

The purpose underlying the present invention essentially resides in improving an internal combustion engine of this type. To this end provision is made according to the present invention that the switch for the operation of the auxiliary unit is operatively connected either directly or indirectly with a mechanism for the increase of the filling for the working cylinders of the internal combustion engine and in that this mechanism, exclusively in the position of the switch for the engagement of the auxiliary drive, now effects or brings about necessarily an increase of the filling corresponding to the idling torque during the idling operation of the internal combustion engine.

It is achieved by the present invention that, for example, the air-conditioning installation of a vehicle also parked in the sun can be operated in the idling speed of the internal combustion engine. A further advantage of the present invention resides in that an operation, free from disturbances of the internal combustion engine is assured when the engine is started at a high engine temperature and with the auxiliary drive engaged or turned on.

In simplification of the inventive concept, there may be supplied at all times by means of the installation of the present invention with an engaged auxiliary drive and independently of the load of the internal combustion engine a filling to the working cylinders whose minimum amount corresponds to an increased idling torque.

The mechanism for increasing the filling for the working cylinders may act in a simple and advantageous manner on the control or regulating member of the internal combustion engine for the supply of fuel and combustion air.

Known in the prior art is an internal combustion engine, on the control member of which acts independently of the other actuation thereof an adjusting motor whose auxiliary force is controlled in dependence on the clutch or shifting operations of a change-speed gear connected in the power path behind the internal combustion engine. According to a further development of the present invention of such known internal combustion engine, the adjusting motor may be operatively connected with an additional auxiliary force line, uninfluenced by the clutch and/or shifting operations of the change-speed gear, which is connected in one of the positions of the switch for the auxiliary drive with an auxiliary force source.

Furthermore, an internal combustion engine of the aforementioned type is known in the prior art in which a shiftable separating clutch is arranged in the power-transmitting train between the drive shaft and the auxiliary drive. The separating clutch is actuated by an auxiliary shifting force is dependence on a control member. For this purpose, an auxiliary control force is supplied to the adjusting motor of this control member which in one position of the switch for the auxiliary drive is released and in the other position thereof is blocked. According to the present invention, such prior art internal combustion engine may be further developed in that in the additional auxiliary force line for the adjusting motor operatively connected with the control or regulating member of the internal combustion engine there is arranged a control member, to the adjusting motor of which is supplied an auxiliary force which is derived from the auxiliary shifting force for the separating clutch.

Advantageously, the auxiliary force for the adjusting motor of the control or regulating member and the auxiliary shifting force for the separating clutch can be derived from a common source of auxiliary force.

Accordingly, it is an object of the present invention to provide an internal combustion engine for the drive of vehicles which eliminates by simple means the aforementioned shortcomings and drawbacks encountered in the prior art constructions.

Another object of the present invention resides in an internal combustion engine, particularly of the injection type, adapted to drive an auxiliary unit which offers an improved operating performance, particularly insofar as adverse influences are concerned due to the varying load of the auxiliary unit.

A further object of the present invention resides in an internal combustion engine of the type described above, driving an air-conditioning unit of the vehicle, which can be operated even when the vehicle is parked in full sun.

A still further object of the present invention resides in a control system for an internal combustion engine which assures a completely satisfactory operation of the engine, free from troubles and disturbances, even when started at high engine temperatures with the auxiliary unit turned on.

Another object of the invention resides in a control system for internal combustion engines intended for driving vehicles provided with auxiliary units which permits completely satisfactory operation as well as starting of the engine with or without the auxiliary units connected to the engine.

Figure 2:
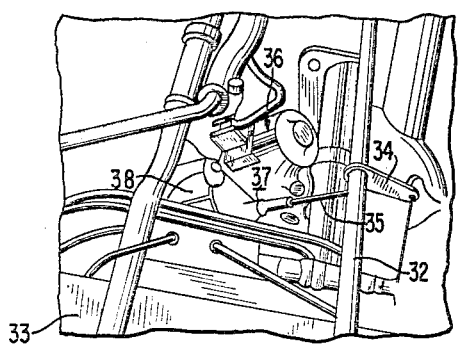

These and further objects, features, and advantages of the present invention will become more obvious from the following description when taken in connection with the accompanying drawing which shows, for purposes of illustration only, one embodiment in accordance with the present invention, and wherein:

FIGURE 1 is a perspective view of an injection-type piston internal combustion enigne for the drive of a motor vehicle having an automatic change-speed transmission;

FIGURE 2 is a perspective view, from a different angle and on an enlarged scale, of the part of the internal combustion engine indicated in FIGURE 1 by II; and FIGURE 3 is a schematic control diagram for a compressor of the air-conditioning installation of the respective motor vehicle which is driven from the internal combustion engine of FIGURES 1 and 2 by way of a disengageable separating clutch.

Referring now to the drawing wherein like reference numerals are used throughout the various views to designate like parts and more particularly to FIGURES 1 and 2, the internal combustion engine illustrated therein includes a crankcase 10 and a transmission housing 11 for a hydrodynamic coupling and an automatic transmission connected to the rear thereof, which is flangedly connected to the output end of the crankcase 10; the automatic transmission is of any conventional construction, is adapted to be automatically shifted in a conventional manner, and is connected to the rear of the hydrodynamic coupling.

The injection pump unit generally designated by reference numeral 12 is arranged on the left side of the crankcase 10 whereas on the right side—always in relation to the normal forward driving direction of the vehicle—individual suction-air pipes 13 to 18 for the filling of the working cylinders of the engine are flangedly connected. Each of the individual suction pipes 13 to 18 is provided in proximity to its respective working cylinder with a conventional injection valve (not shown) which is connected by way of a separate fuel-pressure line 19 to 24, respectively, to the injection pump unit 12.

The individual suction pipes 13 to 18 are connected at their input sides with a common suction intake manifold 25. A throttle-valve connecting pipe section 26 is flangedly connected to the common intake manifold 25 in which is arranged a conventional throttle valve (not shown). The throttle valve arranged inside the connecting section 26 and a throttle valve lever 27 on the outside of the connecting section 26 are both securely connected with a shaft (not shown) for common rotation therewith which extends through the connecting section 26 perpendicularly to its axis and in a rotatable manner.

The throttle valve lever 27 is in direct, movement-dependent connection by way of a lever drive or lever-actuating system generally designated by reference numeral 28 with an adjusting lever 29 for the control of the injection quantity of the injection pump unit 12.

A shaft 22 of the lever system 28 which is rotatably supported in fixed bearing mounts 30 and 31 of the cylinder head 33 and/or the common intake manifold 25, is provided with a lever arm 34 rotating in unison therewith to which is pivotally connected an intermediate rod 35 (FIGS. 1 and 2).

The intermediate rod 35 may be operatively connected with the movable core or armature of an electric stroke magnet, generally indicated in FIGURE 1 by reference numeral 36 and more fully visible in FIGURE 2, in a manner to be described more fully hereinafter.

The housing 37 of the magnet 36 is rigidly connected with a stationary, fixed bearing bracket 38 of the cylinder head 33.

During the energization of the magnet 36, the throttle valve in the connecting section 26 can be moved in the closing direction only up to a second idling position in which there is supplied to the working cylinders of the internal combustion engine, a filling increased in relation to the normal filling determined by the normal, first idling position so that the idling torque or idling rotational speed is increased.

If the throttle valve in the connecting section 26 is in the normal, first idling position, it is forcibly displaced during energization of the magnet 36 into the second idling position.

The control of the magnet 36 is visible from FIGURE 3. In this figure, the magnet is indicated at 36 in dash lines. The magnet winding, designated by reference numeral 36a, is connected at the input side with a conventional current source 39. The electric circuit 36b to the magnet winding 36a can be closed by means of an electric pressure switch 40 and 41, each operating to close the circuit 36b by itself since they are connected in parallel.

The oil pressure switch 40 receives a hydraulic control pulse for closing the circuit 36b when one of the forward speeds of the automatic change-speed gear is engaged or the selector lever in the vehicle is displaced by the driver in one of the positions of the selector range for the forward speeds.

The oil pressure switch 41 receives a hydraulic control pulse for closing the circuit 36b for the magnet winding 36a when the selector lever of the driver is in the position for the reverse speed.

OPERATION

The operation of the control arrangement for the magnet 36 described so far hereinabove is such that in the idling speed of the internal combustion engine, the throttle valve thereof is moved into the second idling position when one of the forward speeds or the reverse speed is engaged or preselected.

If, in contrast thereto, the selector lever of the driver is in a neutral position in which none of the existing speeds are preselected, then the energizing circuit 36b of the magnet winding 36a remains open and the throttle valve of the internal combustion engine is in the normal, first idling position.

The motor vehicle driven by the internal combustion engine described hereinabove is equipped with an air-conditioning installation for the passenger space. The compressor of the air-conditioning installation is driven by the drive shaft of the internal combustion engine. Between the drive shaft and the compressor, there is arranged in the torque-transmitting path an electro-magnetic separating clutch shown in dash lines and indicated at 42 in FIGURE 3.

The energizing circuit 42b of the electro-magnetic actuating or energizing part 42a of the separating clutch 42 can be closed by a control relay 43. The energizing circuit 43b of the electric control part 43a in the control relay 43 is closed or opened by a conventional switch generally designated by reference numeral 44.

During the closing of the electric circuit 42b, an electric current circuit 45b for the electric control part 45a of a control relay 45 is closed simultaneously by the control relay 43.

The electric circuit 36b for the magnet winding 36a of the electro-magnet 36 can be closed by the control relay 45 independently of the oil pressure switches 40 and 41.

For purposes of engaging the compressor of the air-conditioning installation, the electric circuit 43b has to be closed by means of the switch 44. As a result of the energization produced thereby of the electro-magnetic control relay 43, the latter simultaneously closes the electric circuit 42b for the separating clutch 42 and the control circuit 45b for the electro-magnetic control relay 45.

The latter closes the electric control circuit 36b for the electro-magnet 36. It is achieved in this manner that the throttle valve of the internal combustion engine is always disposed during idling speed operation and with an engaged or turned-on air-conditioning installation in the second idling speed position for an increased filling, i.e., for an increased idling rotational speed or for an increased idling speed torque. An advantage of this measure resides in the fact that the idling rotational speed of the internal combustion engine does not drop to a critical value even with a turned-on air-conditioning installation and notwithstanding high external temperatures.

A second advantage of this increase in the filling of the working cylinders consists in that the further running of the internal combustion engine re-started at high engine temperatures and with a turned-on air-conditioning installation is assured without danger of disturbance.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. An internal combustion engine for driving vehicles and having at least one auxiliary drive associated therewith for driving accessories of the vehicle equipment and regulating means for establishing a first idling torque for said engine, wherein the improvement essentially comprises:

electromagnetic clutch means operatively connected between the auxiliary drive and an accessory of the vehicle for selectively engaging the same;

switch means for selectively engaging and disengaging said clutch means;

means for adjusting said regulating means to establish a second idling torque for said engine; and control relay means responsive to said switch means for actuating said adjusting means upon engagement of said clutch means.

2. An internal combustion engine according to claim 1, wherein there is provided change-speed transmission means connected to said engine, and additional switch means responsive to the shifting operations of said transmission means for actuating said adjusting means independent of said control relay means.

3. An internal combustion engine according to claim 2, wherein said additional switch means includes a first oil pressure switch responsive to shifting operations of said transmission means for forward speeds.

4. An internal combustion engine according to claim 3, wherein said additional switch means further includes a second oil pressure switch responsive to shifting operations of said transmission means for reverse speed.

5. An internal combustion engine according to claim 4, wherein said switch means includes a source of D.C. voltage and a switch selectively connecting said source to said clutch means.

6. An internal combustion engine according to claim 5, wherein said first and second oil pressure switches are connected in parallel between one side of said D.C. source and one side of said adjusting means, the other side of said adjusting means being connected directly to the other side of said D.C. source.

7. An internal combustion engine according to claim 6, wherein said control relay means includes a solenoid having an operating winding connected between one side of said D.C. source and said switch forming part of said switch means and contacts responsive to said operating winding for connecting said one side of said D.C. source to said one side of said adjusting means.

8. An internal combustion engine according to claim 1, wherein said switch means includes a source of D.C. voltage and a switch selectively connecting said source to said clutch means.

9. An internal combustion engine according to claim 8, wherein said control relay means includes a solenoid having an operating winding connected between one side of said D.C. source and said switch forming part of said switch means, and contacts responsive to said operating winding for connecting said one side of said D.C. source to one side of said adjusting means, the other side of said adjusting means being connected directly to the other side of said D.C. source.

10. An internal combustion engine according to claim 9, wherein the operating winding of said solenoid is connected to the point of connection of said switch with said clutch means, the other side of said clutch means being connected to said other side of said D.C. source.

11. An internal combustion engine according to claim 2, wherein said control relay means includes a solenoid having an operating winding connected between one side of said D.C. source and said switch forming part of said switch means, and contacts responsive to said operating winding for connecting said one side of said D.C. source to one side of said adjusting means, the other side of said adjusting means being connected directly to the other side of said D.C. source.

12. An internal combustion engine according to claim 11, wherein said regulating means includes means for regulating the supply of fuel and combustion air to the engine.

References Cited

UNITED STATES PATENTS

| | | | |
|---|---|---|---|
| 3,186,184 | 6/1965 | Pruitt | 62—243 |
| 3,315,487 | 4/1967 | Heaton | 62—243 XR |
| 2,720,087 | 10/1955 | Groene | 180—77 X |
| 2,915,914 | 12/1959 | Burnell et al. | 74—873 |
| 2,929,226 | 3/1960 | Baker et al. | 180—77 X |
| 3,196,972 | 7/1965 | Perrin | 180—77 |
| 3,252,539 | 5/1966 | Ott et al. | 180—77 |
| 3,304,068 | 2/1967 | Thomas | 180—77 |

WENDELL E. BURNS, Primary Examiner

U.S. Cl. X.R.

62—243; 74—873; 123—198; 180—77